US009264567B2

(12) United States Patent
Urakawa

(10) Patent No.: US 9,264,567 B2
(45) Date of Patent: Feb. 16, 2016

(54) TERMINAL DEVICE, SERVER, SCREEN DISPLAY METHOD, SCREEN CONTROL METHOD, AND COMPUTER PROGRAM

(75) Inventor: Yutaka Urakawa, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 760 days.

(21) Appl. No.: 13/288,803

(22) Filed: Nov. 3, 2011

(65) Prior Publication Data
US 2012/0113469 A1 May 10, 2012

(30) Foreign Application Priority Data

Nov. 4, 2010 (JP) .................. 2010-247153

(51) Int. Cl.
G06F 15/00 (2006.01)
H04N 1/00 (2006.01)
G06F 3/12 (2006.01)

(52) U.S. Cl.
CPC ............ *H04N 1/00973* (2013.01); *G06F 3/122* (2013.01); *G06F 3/1253* (2013.01); *G06F 3/1271* (2013.01); *G06F 3/1285* (2013.01); *H04N 1/00244* (2013.01); *H04N 1/00427* (2013.01); *H04N 1/00464* (2013.01);
(Continued)

(58) Field of Classification Search
CPC .......... H04N 1/00405; H04N 1/00408; H04N 1/00411; H04N 1/00413; H04N 1/00419; H04N 1/00501
USPC ....................................................... 358/1.15
See application file for complete search history.

(56) References Cited

U.S. PATENT DOCUMENTS

2005/0134903 A1    6/2005  Tanimoto et al.
2006/0077444 A1    4/2006  Lum et al.
(Continued)

FOREIGN PATENT DOCUMENTS

CN    1226981 A    8/1999
CN    1625209 A    6/2005
(Continued)

OTHER PUBLICATIONS

European Patent Office, European Search Report for European Patent Application No. 1187734.6 (counterpart to co-pending U.S. Appl. No. 13/288,748), dated Mar. 16, 2012.
(Continued)

Primary Examiner — Peter K Huntsinger
Assistant Examiner — Mark Milia
(74) Attorney, Agent, or Firm — Merchant & Gould PC

(57) ABSTRACT

A terminal device includes a reception control unit which receives a display instruction for displaying of a first screen, and an execution instruction for instructing executing of a function unit, from a server, a display control unit which displays the first screen according to the display instruction, and which displays a second screen according to internal information of the device when the function unit is executing a function; and a transmission control unit. When an operation unit is operated while the first screen is displayed, the transmission control unit transmits a result representing the operation to the operation unit and an identifier identifying the display instruction. When the function unit has executed a function according to the execution instruction, the transmission control unit transmits a result representing an end of the execution and an identifier identifying the execution instruction.

19 Claims, 10 Drawing Sheets

(52) U.S. Cl.
CPC ....... *H04N1/00477* (2013.01); *H04N 1/00482* (2013.01); *H04N 1/00501* (2013.01); *G06F 3/1259* (2013.01); *H04N 2201/0039* (2013.01); *H04N 2201/0094* (2013.01)

(56) References Cited

U.S. PATENT DOCUMENTS

| | | | |
|---|---|---|---|
| 2008/0246989 A1* | 10/2008 | Konuma | 358/1.15 |
| 2008/0263229 A1* | 10/2008 | Huster et al. | 710/8 |
| 2009/0109472 A1 | 4/2009 | Kobayashi et al. | |
| 2009/0228813 A1 | 9/2009 | Sekiguchi | |
| 2011/0252085 A1 | 10/2011 | Mase et al. | |
| 2012/0113468 A1 | 5/2012 | Urakawa | |

FOREIGN PATENT DOCUMENTS

| | | |
|---|---|---|
| CN | 101426070 A | 5/2009 |
| EP | 0 897 156 A1 | 2/1999 |
| JP | 10-224570 A | 8/1998 |
| JP | H11-212914 A | 8/1999 |
| JP | 2003-333538 A | 11/2003 |
| JP | 2004-259070 A | 9/2004 |
| JP | 2006-340204 A | 12/2006 |
| JP | 2007-87398 A | 4/2007 |
| JP | 2009-207872 A | 9/2009 |
| WO | 2010/087257 A1 | 8/2010 |

OTHER PUBLICATIONS

Dunkel, Jurgen, et al., "Model-Driven Architecture for Mobile Applications," Business Information Systems [Lecture Notes in Computer Science], Apr. 25, 2007, pp. 464-477, Springer Berlin Heidelberg, ISBN 978-3-540-72034-8 (concise explanation of relevance provided in attached European Search Report).

Chinese Office Action issued in CN 201110344796.9, mailed Dec. 20, 2013.

Japanese Office Action issue in JP 2010-247153, mailed Dec. 17, 2013.

* cited by examiner

*FIG. 3A*

UNIQUE NUMBER: 001
  INSTRUCTION TYPE: UI INSTRUCTION
UI INSTRUCTION INFORMATION
  TITLE: "SERVICE SELECTION"
  UNIQUE INFORMATION: UNIQUE LIST INFORMATION
  INSTRUCTION MODE: SERVER INSTRUCTION MODE
UNIQUE LIST INFORMATION
  LIST: "SERVICE A", "SERVICE B", "..."
  SELECTION METHOD: SELECT ONE CHOICE

*FIG. 3B*

UNIQUE NUMBER: 003
  INSTRUCTION TYPE: UI INSTRUCTION
UI INSTRUCTION INFORMATION
  TITLE: "COPY RESOLUTION"
  UNIQUE INFORMATION: UNIQUE INPUT BOX INFORMATION
  INSTRUCTION MODE: SERVER INSTRUCTION MODE
UNIQUE INPUT BOX INFORMATION
  INITIAL VALUE FOR BOX: "200"
  CHARACTERS CAPABLE OF BEING INPUT: NUMERICAL VALUES
  MAXIMUM NUMBER OF CHARACTERS: 3, MINIMUM NUMBER
  OF CHARACTERS: 3

*FIG. 3C*

UNIQUE NUMBER: 008
  INSTRUCTION TYPE: UI INSTRUCTION
UI INSTRUCTION INFORMATION
  TITLE: "COPY START CONFIRMATION"
  UNIQUE INFORMATION: UNIQUE MESSAGE INFORMATION
  INSTRUCTION MODE: SERVER INSTRUCTION MODE
UNIQUE MESSAGE INFORMATION
  MESSAGE: "TO START COPY, PLEASE PUSH 'NEXT' KEY"

*FIG. 3D*

UNIQUE NUMBER: 009
  INSTRUCTION TYPE: UI INSTRUCTION
UI INSTRUCTION INFORMATION
  INSTRUCTION MODE: DEVICE INSTRUCTION MODE

*FIG. 3E*

UNIQUE NUMBER: 010
  INSTRUCTION TYPE: FUNCTION EXECUTION INSTRUCTION
FUNCTION EXECUTION INSTRUCTION INFORMATION
  EXECUTION TYPE: COPY
(SETTING INFORMATION: ADD DETERMINED INFORMATION TO
 INSTRUCTION INFORMATION IN ADDITION STEP)

FIG. 4A

| SERVICE SELECTION | PREVIOUS | NEXT | ENTER |

SERVICE A

SERVICE B

| COPY RESOLUTION | PREVIOUS | NEXT | ENTER |

200 | 1 | 2 | 3 | 4 | 5

← | → | 6 | 7 | 8 | 9 | 0

CLEAR

FIG. 4C

| COPY START CONFIRMATION | PREVIOUS | NEXT | ENTER |

TO START COPY, PLEASE PUSH 'NEXT' KEY

FIG. 4D

PRINTING

FIG. 6

| TEMPLATE INFORMATION | | TOUCH PANEL MODEL | NON-TOUCH-PANEL MODEL |
|---|---|---|---|
| BASIC SCREEN INFORMATION | | · BASIC SCREEN INFORMATION (BITMAP INFORMATION) | · BASIC SCREEN INFORMATION (BITMAP INFORMATION) |
| OPERATION KEY INFORMATION | | · INFORMATION REPRESENTING WHETHER MULTI-FUNCTION DEVICE IS TOUCH PANEL MODEL OR NON-TOUCH-PANEL MODEL<br>· BITMAP INFORMATION REPRESENTING EACH KEY ASSOCIATED WITH OPERATION OF EACH OF 'ENTER' KEY, 'PREVIOUS' KEY, AND 'NEXT' KEY<br>· INFORMATION REPRESENTING POSITION OF EACH KEY<br>· INFORMATION REPRESENTING POSITION OF TITLE | · INFORMATION REPRESENTING WHETHER MULTI-FUNCTION DEVICE IS TOUCH PANEL MODEL OR NON-TOUCH-PANEL MODEL<br>· INFORMATION REPRESENTING WHICH HARD KEY IS ASSOCIATED WITH OPERATION OF EACH OF 'ENTER' KEY, 'PREVIOUS' KEY, AND 'NEXT' KEY<br>· INFORMATION REPRESENTING WHETHER TO LIGHT UP HARD KEYS CORRESPONDING TO 'ENTER' KEY, 'PREVIOUS' KEY, AND 'NEXT' KEY<br>· INFORMATION REPRESENTING POSITION OF TITLE |
| UNIQUE SCREEN TYPE INFORMATION | LIST | — | — |
| | INPUT BOX | · INFORMATION REPRESENTING WHAT UNIQUE KEYS ARE ('←' (LEFT ARROW) KEY, '→' (RIGHT ARROW) KEY, CLEAR KEY, AND CHARACTER KEYS (FOR EXAMPLE, KEYS OF '0' TO '9'))<br>· BITMAP INFORMATION REPRESENTING '←' (LEFT ARROW) KEY, '→' (RIGHT ARROW) KEY, CLEAR KEY, AND CHARACTER KEYS<br>· INFORMATION REPRESENTING POSITIONS OF '←' (LEFT ARROW) KEY, '→' (RIGHT ARROW) KEY, CLEAR KEY, AND CHARACTER KEYS | · INFORMATION REPRESENTING WHAT UNIQUE KEYS ARE ('←' (LEFT ARROW) KEY, '→' (RIGHT ARROW) KEY, CLEAR KEY, CHARACTER KEYS (FOR EXAMPLE, KEYS OF '0' TO '9'), AND SELECTION KEY)<br>· BITMAP INFORMATION REPRESENTING CHARACTER KEYS<br>· INFORMATION REPRESENTING POSITIONS OF CHARACTER KEY<br>· INFORMATION REPRESENTING WHICH HARD KEY IS ASSOCIATED WITH OPERATION OF EACH OF '←' (LEFT ARROW) KEY, '→' (RIGHT ARROW) KEY, CLEAR KEY, AND SELECTION KEY |
| | MESSAGE | — | — |

FIG. 9

```
TREE INFORMATION
   UNIQUE NUMBER  :  PREVIOUS  :  NEXT
        001       :    NONE    :  002
        002       :    001     :  003
        003       :    002     :  004
        ...
        008       :    007     :  009
        009       :    008     :  010
        010       :    009     :  011
        ...
        022       :    035     :  021
        ...
        035       :    034     :  036
        ...
        212       :    211     :  NONE
```

FIG. 10A

```
FIRST CORRESPONDENCE INFORMATION
   UNIQUE NUMBER: TYPE OF DETERMINED INFORMATION
   UNIQUE NUMBER 003: COPY RESOLUTION
   UNIQUE NUMBER 004: THE NUMBER OF COPIES
   UNIQUE NUMBER 005: COLOR/MONOCHROME MODE
      ...
   UNIQUE NUMBER 013: RESOLUTION OF SCAN-TO-MEDIA
      ...
```

FIG. 10B

```
DETERMINED INFORMATION TABLE
   COPY RESOLUTION: 200 dpi
   THE NUMBER OF COPIES: 3
   COLOR/MONOCHROME MODE: COLOR
      ...
   RESOLUTION OF SCAN-TO-MEDIA: 600 dpi
      ...
```

FIG. 10C

```
SECOND CORRESPONDENCE INFORMATION
   UNIQUE NUMBER: TYPE OF DETERMINED INFORMATION
   UNIQUE NUMBER 010: COPY RESOLUTION, THE NUMBER OF COPIES,
   COLOR/MONOCHROME MODE,
      ...
   UNIQUE NUMBER 033: RESOLUTION OF SCAN-TO-MEDIA,
      ...
```

TERMINAL DEVICE, SERVER, SCREEN DISPLAY METHOD, SCREEN CONTROL METHOD, AND COMPUTER PROGRAM

CROSS-REFERENCE TO RELATED APPLICATION

This application claims priority from Japanese Patent Application No. 2010-247153, filed on Nov. 4, 2010, the entire subject matter of which is incorporated herein by reference.

TECHNICAL FIELD

Aspects of the present invention relate to a terminal device, a server, a screen display method, a screen control method, and a computer program.

BACKGROUND

There has been proposed techniques for displaying a predetermined moving image on a display unit (see, for example, JP-A-2006-340204 and JP-A-2003-333538). JP-A-2006-340204 describes a video phone communication terminal which exchanges image data with a video phone communication terminal of a communicating party and displays an image according to acquired image data until a transmission/reception process of a video phone starts. JP-A-2003-333538 describes a moving image playing apparatus which repeatedly plays a short animation based on stored moving image data while downloading data from a server.

SUMMARY

In the meantime, when a predetermined function is executed in a terminal device, information for the function execution and information involved in the function execution need to be appropriately displayed on a display unit of the terminal device. For example, those information need to be displayed at an appropriate timing with the start of the function execution.

Accordingly, an aspect of the present invention provides a terminal device, a server, a screen display method, a screen control method, and a computer program which are capable of appropriately performing screen display on a display unit of the terminal device.

According to an illustrative embodiment of the present invention, there is provided a terminal device configured to communicate with a server, the terminal device comprising: an operation unit configured to receive a user operation; a function unit configured to execute a predetermined function; a display unit configured to display a predetermined screen; a first reception control unit configured to receive a screen display instruction which is related to displaying of a first type screen and is identified by a unique identifier, and an execution instruction which instructs executing of the function unit and is identified by a unique identifier, from the server; a display control unit configured to display the first type screen on the display unit according to the screen display instruction when the first reception control unit receives the screen display instruction, and configured to display a second type screen on the display unit according to information stored in the terminal device when the first reception control unit receives the execution instruction and the function unit is executing a function; and a first transmission control unit, wherein when the operation unit is operated in a state where the display control unit is displaying the first type screen on the display unit, the first transmission control unit is configured to transmit an operation result representing the operation to the operation unit and a unique identifier matching the unique identifier identifying the screen display instruction for the displaying of the first type screen, to the server, and wherein when the function unit has executed a function according to the execution instruction, the first transmission control unit is configured to transmit an execution result representing an end of the executing of the function unit and a unique identifier matching the unique identifier identifying the execution instruction for the executing of the function unit, to the server.

According to another illustrative embodiment, there is provided a server configured to communicate with a terminal device which includes: a function unit configured to execute a predetermined function; a display unit configured to display a predetermined screen; and a display control unit configured to display a second type screen on the display unit according to information stored in the terminal device when the function unit is executing a function. The server comprises: a first storage unit configured to store a plurality of screen display instructions, each of which is related to displaying of a first type screen on the display unit and is identified by an unique identifier, and a plurality of execution instructions, each of which instructs executing of the function unit and is identified by a unique identifier; a second storage unit configured to store tree information defining sequences of the plurality of screen display instructions and the plurality of execution instructions, based on the respective unique identifiers thereof; a second transmission control unit configured to transmit any of a screen display instruction and an execution instruction to the terminal device; and a second reception control unit configured to receive a unique identifier and an operation result, wherein the unique identifier and the operation result are replied by the terminal device having received the screen display instruction transmitted by the second transmission control unit when an operation unit of the terminal device is operated in a state where the display control unit is displaying a first type screen on the display unit according to the received screen display instruction, and wherein the unique identifier matches an unique identifier identifying the screen display instruction for the displaying of the first type screen, and the operation result represents the operation to the operation unit; and an identifying unit, wherein when the second reception control unit receives the unique identifier and the operation result, the identifying unit is configured to identify a screen display instruction or an execution instruction to be newly transmitted to the terminal device based on the unique identifier received by the second reception control unit and the tree information, and wherein the second transmission control unit is configured to newly transmit the screen display instruction or the execution instruction identified by the identifying unit.

According to further illustrative embodiments, there is provided a screen display method, a screen control method and a computer-readable medium for storing a computer program for implementing the functions of the terminal device, the server or the system including the terminal device and the server.

According to the above configuration, it is possible to provide a terminal device, a server, a screen display method, a screen control method, and a computer program capable of appropriately performing screen display on a display unit of the terminal device.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 3A to 3E are diagrams illustrating description contents of individual definition information;

FIGS. 4A to 4D are diagrams illustrating examples of screens displayed on a display unit, wherein:

FIG. 4A shows a screen (list screen) generated according to the individual definition information shown in FIG. 3A;

FIG. 4B shows a screen (input box screen) generated according to the individual definition information shown in FIG. 3B;

FIG. 4C shows a screen (message screen) generated according to the individual definition information shown in FIG. 3C; and FIG. 4D shows a screen displayed during printing;

FIG. 6 is a diagram illustrating an example of template information of a case where the display unit of the multi-function device has a touch panel function, and an example of template information of a case where the display unit of the multi-function device does not have a touch panel function;

FIG. 9 is a diagram illustrating tree information; and

FIG. 10A is a diagram illustrating first correspondence information, FIG. 10B is a diagram illustrating a determined information table, and FIG. 10C is a diagram illustrating second correspondence information.

DETAILED DESCRIPTION

Illustrative embodiments of the present invention will be described with reference to the accompanying drawings. The present invention is not limited by a configuration described below, but can have various configurations without departing from the scope of the present invention. For example, a portion of the following configuration may be omitted or substituted with another configuration. Also, a portion of the following configuration may include another configuration.

<Entire Configuration of System>

Figure 1:
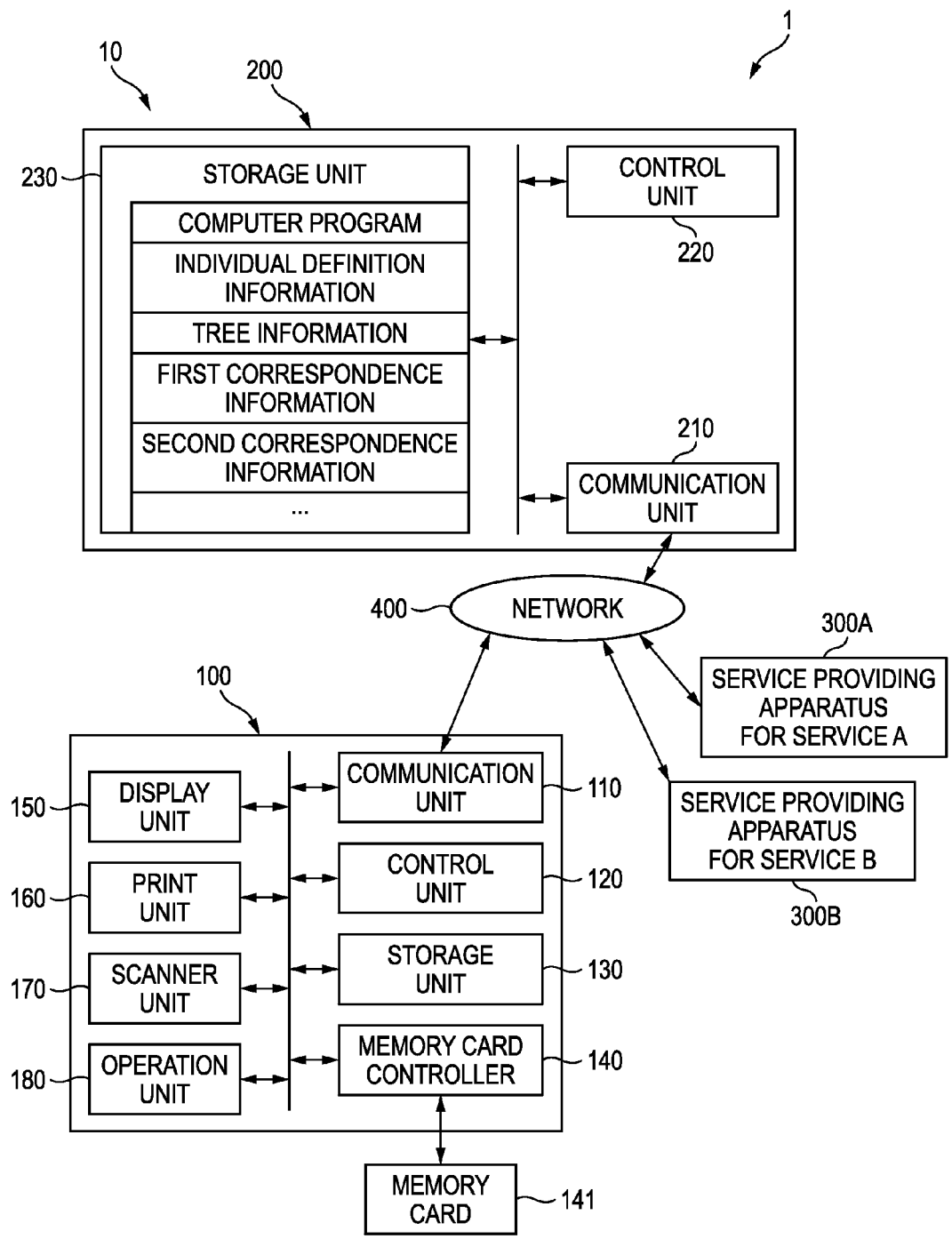
FIG. 1 is a diagram illustrating an example of an entire configuration of a system including a screen control system, and specifically, a block diagram illustrating an example of a hardware configuration of a multi-function device and a relay server.

As shown in FIG. 1, a system 1 includes a screen control system 10, and service providing servers 300A and 300B (generally referred to as a service providing server 300). The system 1 is, for example, a service cooperation system. The screen control system 10 includes a multi-function device 100 and a relay server 200. The multi-function device 100, the relay server 200, and the service providing servers 300A and 300B are connected to one another through a network 400 to be capable of data communication. FIG. 1 shows a single multi-function device 100; however, a plurality of multi-function devices 100 may exist. Examples of the network 400 include an Internet network. In the system 1, it is possible to upload and/or download electric files in electric-file storing services provided by service providers. Examples of other services include a document generating/editing service, and documents (electric files) based on the document generating/editing service can be shared with other users. Those services are provided by communication based on HTTP (for example, HTTP/1.1) between the service providing server 300 and terminals connected to the network 400. In the following description, the above-mentioned services are referred to as services A and B. The service A is provided by the service providing server 300A, and the service B is provided by the service providing server 300B.

The multi-function device 100 is specifically a small-sized digital combined machine, and has, for example, a printing function, a scanner function, a fax function, and copy function. The multi-function device 100 can upload electronic files of images read by the scanner function, in the electronic-file storing service. Also, the multi-function device 100 can download electronic files in the electronic-file storing service and the like, and prints the downloaded electric files by the printing function. The multi-function device 100 receives the electric-file storing service and the like in cooperation with the relay server 200. At this time, screens to be displayed on a display unit 150 of the multi-function device 100 are managed by the relay server 200. The relay server 200 has a known server function.

<Hardware Configurations of Multi-Function Device and Relay Server>

As shown in FIG. 1, the multi-function device 100 includes a communication unit 110, a control unit 120, a storage unit 130, a memory card controller 140, a display unit 150, a print unit 160, a scanner unit 170, and an operation unit 180. The communication unit 110 performs communication with other apparatuses connected to the network 400. As the communication unit 110, a known network card can be used. The control unit 120 includes a central processing unit (CPU), and a ROM and a RAM electrically connected to the CPU (not shown). The CPU controls the operation of the multi-function device 100 in accordance with computer programs stored in the ROM. The computer programs stored in the ROM include computer programs for each of processes shown in FIGS. 2 and 5. Further, the computer programs include a rendering driver for generating screens. The RAM temporally stores various kinds of data.

The storage unit 130 may be a known non-volatile storage device such as a NAND-type flash memory. The storage unit 130 stores various kinds of data and/or information to be described below. The memory card controller 140 performs writing of data in a memory card 141, erasing of data stored in the memory card 141, reading of data stored in the memory card 141, or the like, based on an instruction of the control unit 120. In the memory card 141, electronic files having predetermined formats are stored. The display unit 150 has a display device such as a known LCD. The display unit 150 displays various screens to be described below. The display unit 150 may be a model having a touch panel function (hereinafter, referred to as a touch panel model) or a model having no touch panel function (hereinafter, referred to as a non-touch-panel model). The print unit 160 prints images according to an instruction of the control unit 120. The scanner unit 170 reads images recorded on sheets set by the user. The scanner unit 170 reads images according to an instruction of the control unit 120. The operation unit 180 includes a plurality of operation buttons operable by the user. The user can input a desired instruction by operating the operation unit 180.

As shown in FIG. 1, the relay server 200 includes a communication unit 210, a control unit 220, and a storage unit 230. The communication unit 210 performs communication with other apparatuses connected to the network 400. As the communication unit 210, a known network card can be used. The control unit 220 includes a CPU, and a ROM and a RAM electrically connected to the CPU (not shown). The CPU controls the operation of the relay server 200 according to computer programs stored in the ROM and the storage unit 230. The RAM temporally stores various kinds of data. The storage unit 230 may be a non-volatile storage device such as a hard disk drive. The storage unit 230 stores computer programs. For example, the stored computer programs include a computer program for a process shown in FIG. 8. Further, the stored computer programs include a computer program for performing communication with the service providing server 300 to provide the services to the multi-function device 100.

<Processes Executed by Screen Control System>

Processes executed by the multi-function device 100 and the relay server 200 when the multi-function device 100 receives the services such as the service A and the service B will be described.

<Main Process Executed by Multi-function Device>

Figures 2, 2A, 2B:
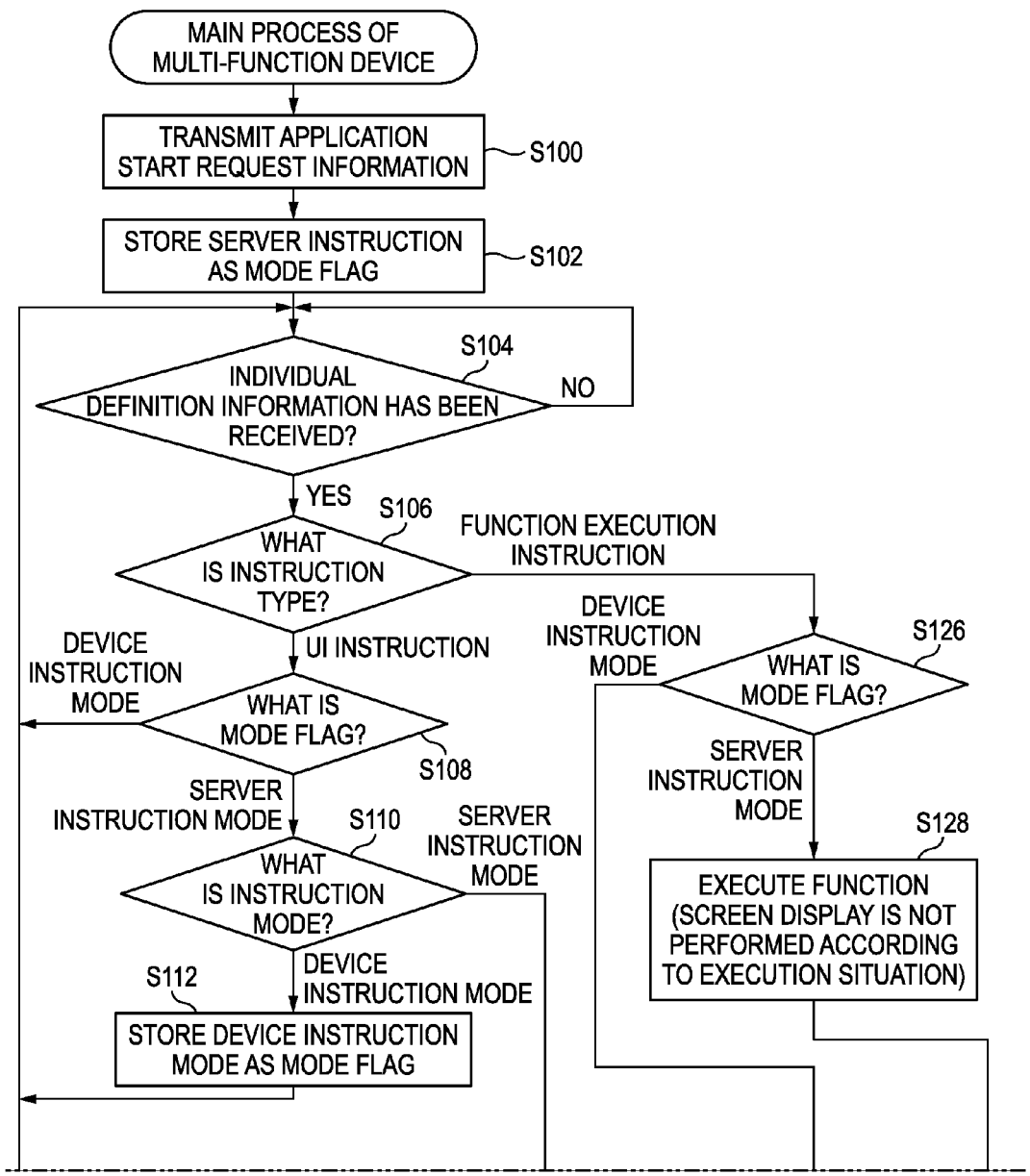
FIG. 2 (FIGS. 2A and 2B) is a flow chart illustrating a main process executed by the multi-function device.
Figure 2B:
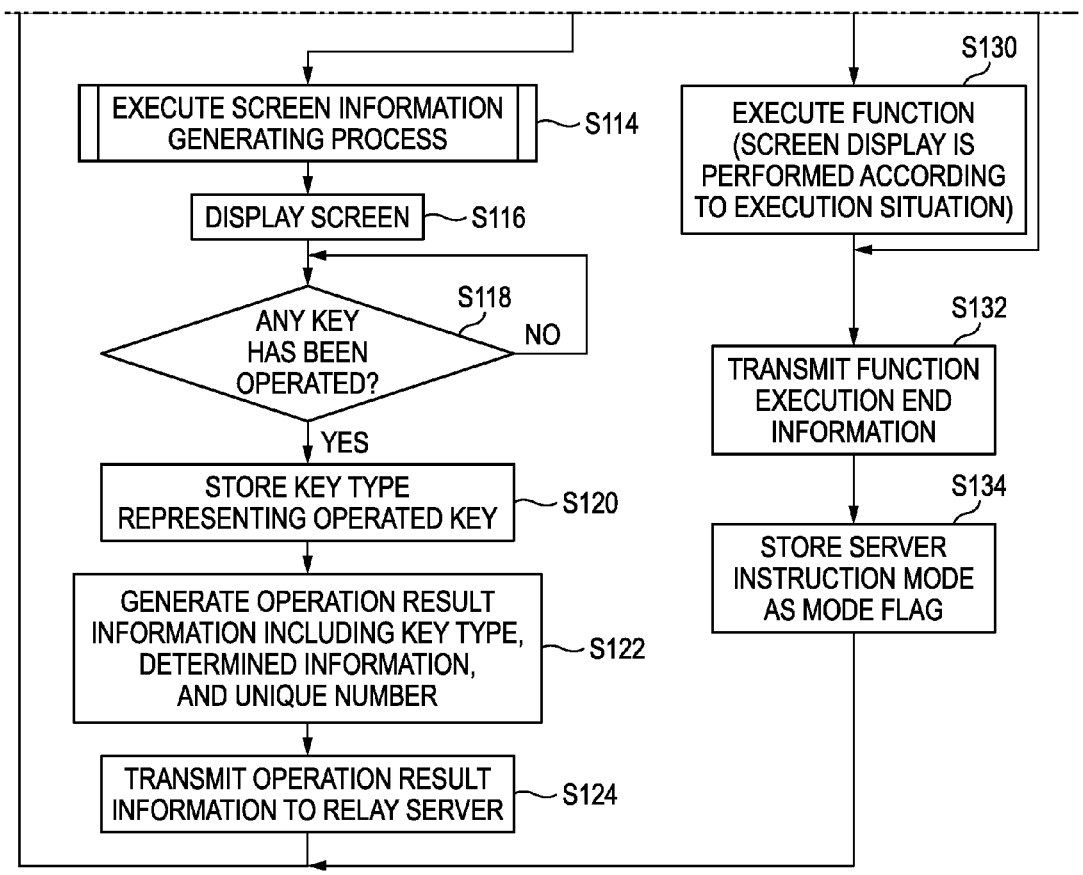

A main process executed by the multi-function device 100 will be described with reference to FIG. 2. In order to start the main process, the user inputs process start to the multi-function device 100. Specifically, if the multi-function device 100 is a touch panel model, the user touches an application start icon. The application start icon is displayed on the display unit 150 of the multi-function device 100 which is in a standby state. If the multi-function device 100 is a non-touch-panel model, the user pushes an operation button which is included in the operation unit 180 and is associated with the main process. When starting the main process, in step S100, the control unit 120 controls the communication unit 110 to transmit application start request information for instructing the start of the main process to the relay server 200. The control unit 120 stores a server instruction mode as a mode flag in step S102. The mode flag may be stored in the RAM or the like included in the control unit 120. The mode flag is used in a process to be described below. The control unit 120 stands by until receiving individual definition information transmitted in response to step S100 by the relay server 200 (No in step S104). The control unit 120 controls the communication unit 110 so as to receive the individual definition information. When receiving the individual definition information (Yes in step S104), the control unit 120 determines an instruction type of the received individual definition information in step S106. The received individual definition information is stored in the RAM or the like.

The individual definition information includes various kinds of information as shown in FIG. 3A to 3E. Specifically, as shown in FIGS. 3A to 3E, each of the individual definition information includes a unique number and an instruction type. The unique number has a function as a unique identifier for identifying the individual definition information. Individual definition information in which the instruction type is a UI instruction includes UI instruction information, as shown in FIGS. 3A to 3D. UI instruction information includes a title, unique information, and an instruction mode. UI instruction information in which the unique information is unique list information includes the unique list information, as shown in FIG. 3A. In the unique list information, a list and a selection method are set. UI instruction information in which the unique information is unique input box information includes the unique input box information, as shown in FIG. 3B. In the unique input box information, an initial value of an input box, characters capable of being input, the maximum number of characters, and the minimum number of characters are set. UI instruction information in which the unique information is unique message information includes the unique message information, as shown in FIG. 3C. In the unique message information, a message is set. Unlike the above-mentioned individual definition information as the UI instructions, in individual definition information shown in FIG. 3D, any title and unique information are not included, and only the instruction mode is set. Individual definition information in which the instruction type is a function execution instruction includes function execution instruction information, as shown in FIG. 3E. The function execution instruction information includes an execution type. The individual definition information in which the instruction type is the function execution instruction includes parameters for executing a designated function as described below. The multi-function device 100 executes (performs) functions such as the printing function, the scanner function, and the copy function according to those parameters. The above-mentioned information included in the individual definition information and the setting will be described below.

When the instruction type included in the individual definition information stored in the RAM is the function execution instruction (function execution instruction in step S106), the control unit 120 proceeds to a process of step S126 to be described below. Meanwhile, when the instruction type is the UI instruction (UI instruction in step S106), the control unit 120 determines the mode flag in step S108. The mode flag is stored in the RAM or the like. When the mode flag represents a device instruction mode (device instruction mode in step S108), the control unit 120 returns to the process of step S104. In this case, any screen is not displayed on the display unit 150. For example, when the relay server 200 becomes an error state and thus transmits inappropriate individual definition information, for example, individual definition information in which the instruction mode is the server instruction mode (see FIGS. 3A to 3C), the multi-function device 100 does not perform a unnecessary process, which is preferable. Meanwhile, when the mode flag represents the server instruction mode (server instruction mode in step S108), the control unit 120 determines the instruction mode included in the individual definition information stored in the RAM in step S110. When the individual definition information stored in the RAM is as shown in FIG. 3D and the instruction mode is the device instruction mode (device instruction mode in step S110), the control unit 120 stores the device instruction mode as the mode flag in step S112. In other words, the control unit 120 updates the mode flag stored in the RAM with the device instruction mode. Then, the control unit 120 returns to the process of step S104. At this time, the control unit 120 erases the individual definition information stored in the RAM. Alternatively, at this timing, the control unit 120 may return to step S104 without erasing. Then, if new individual definition information is received, the individual definition information stored in advance in the RAM may be overwritten with the new individual definition information. Meanwhile, when the individual definition information stored in the RAM is as shown in FIGS. 3A to 3C and the instruction mode is the server instruction mode (server instruction mode in step S110), the control unit 120 executes a screen information generating process in step S114. In the screen information generating process, the individual definition information stored in the RAM is referred to. The screen information generating process executed in step S114 will be described below. After executing the screen information generating process of step S114, in step S116, the control unit 120 displays a predetermined screen on the display unit 150 according to screen information generated in step S114. When the multi-function device 100 is a non-touch-panel model and is capable of lighting up a hard key included in the operation unit 180, if lighting of a hard key is instructed in the screen information, a backlight corresponding to the hard key is lit up.

Screens displayed on the display unit 150 in step S116 will be described with reference to FIGS. 4A to 4C. A case where the multi-function device 100 is a touch panel model is exemplified. When the individual definition information stored in the RAM is as shown in FIG. 3A, a screen shown in FIG. 4A is displayed on the display unit 150. This screen is a screen of a 'list' format corresponding to the unique list information of the individual definition information, and includes the title of 'SERVICE SELECTION', a 'ENTER' key, a 'PREVIOUS' key, and a 'NEXT' key (marked with 'ENTER', 'PREVIOUS', and 'NEXT'). Further, the screen of FIG. 4A includes the service A, the service B, and the like as selection choices of the list. Furthermore, the screen of FIG. 4A includes an UP key and a DOWN key (see two keys shown in FIG. 4A as an upright triangle and an upside-down triangle, respectively). The user selects a desired service by operating (pushing or touching) the UP key and the DOWN key and operating keys with service names marked thereon. If the DOWN key is operated, a list of the next three service names is displayed, and if the UP key is operated, a list of the previous three service names is displayed. One service is selected in correspondence with 'selection of one choice' set as the selection method of the individual definition information.

When the individual definition information stored in the RAM is as shown in FIG. 3B, a screen shown in FIG. 4B is displayed on the display unit 150. This screen is a screen of an 'input box' format corresponding to the unique input box information of the individual definition information, and includes the title of 'COPY RESOLUTION', a 'ENTER' key, a 'PREVIOUS' key, and a 'NEXT' key. This screen includes a left arrow key and a right arrow key (see two keys shown in FIG. 4B by a left arrow and a right arrow), a 'CLEAR' key (marked with 'CLEAR' in FIG. 4B) for erasing a numerical value input in the input box, and numerical keys of 0 to 9 (marked with '0' to '9' in FIG. 4B). The numerical keys of 0 to 9 correspond to the setting option in which characters capable being input are numerical values, and only numerical values can be input into the input box. In the input box of the screen of FIG. 4B, '200' set as the initial value of the input box is input as an initial value of the copy resolution. When changing the copy resolution from the initial value of 200 dpi to, for example, 300 dpi, the left arrow key or the right arrow key is operated so as to move a cursor for inputting a numerical value to the position of '2', the 'CLEAR' key is operated so as to erase '2', and the numerical key of '3' is operated. In this manner, the desired resolution, 300 dpi, is input. The input resolution is a 3-digit numerical value corresponding to the setting options in which the maximum number of characters is 3 and the minimum number of characters is 3.

When the individual definition information stored in the RAM is as shown in FIG. 3C, a screen shown in FIG. 4C is displayed on the display unit 150. This screen is a screen of a 'message' format corresponding to the unique message information of the individual definition information, and includes the title of 'COPY START CONFIRMATION', a 'ENTER' key, a 'PREVIOUS' key, and a 'NEXT' key. The screen of FIG. 4C includes 'TO START COPY, PLEASE PUSH 'NEXT' KEY' as a message corresponding to the message information of the individual definition information. To start copy, the user pushes the 'NEXT' key. When the multi-function device 100 is a non-touch-panel model, a predetermined hard key of the operation unit 180 is assigned to each of the above-mentioned keys.

After executing step S116, in step S118, the control unit 120 determines whether any key has been operated in each screen display. The control unit 120 stands by until any key is operated (No in step S118). When any key has been operated (Yes in step S118), the control unit 120 stores a key type representing the operated key in the RAM in step S120. The key which becomes an object of step S120 is any one of the 'ENTER' key, the 'PREVIOUS' key, and the 'NEXT' key. For example, in step S120, the control unit 120 stores a key type representing the 'ENTER' key. In this case, if predetermined information has been input in correspondence with the screen displayed on the display unit 150, the control unit 120 stores the predetermined information as the determined information. When the screen shown in FIG. 4A is displayed and the service A is selected and determined, an item number '1' representing the service A is stored as the determined information. When the screen shown in FIG. 4B is displayed and the initial value of 200 dpi is determined, '200' is stored as the determined information. Also, when the resolution is changed to 300 dpi and 300 dpi is determined, '300' is stored as the determined information.

After executing step S120, the control unit 120, in S122, generates operation result information including the key type, the determined information, and the unique number stored in the RAM. When the key type represents the 'PREVIOUS' key or the 'NEXT' key, the determined information is not included. This is because the 'PREVIOUS' key and the 'NEXT' key are operated to input an instruction for transitioning the displayed screen. The unique number included in the operation result information is a unique number matching the unique number included in the individual definition information stored in the RAM. For example, when the serve A is selected and determined as described above, the control unit 120 generates operation result information including the key type which has been stored in step S120 and represents 'ENTER', '1' which is the determined information, and the unique number ('001' in FIG. 3A) matching the unique number included in the individual definition information stored in the RAM. Subsequently, in step S124, the control unit 120 controls the communication unit 110 to transmit the generated operation result information to the relay server 200. After the transmission, the control unit 120 returns to the process of step S104. At this time, the control unit 120 erases the individual definition information stored in the RAM. Alternatively, at this timing, the control unit 120 may return to step S104 without erasing. Then, if new individual definition information is received, the individual definition information stored in advance in the RAM may be overwritten with the new individual definition information.

In step S126, the control unit 120 determines the mode flag. The mode flag is stored in the RAM or the like. When the instruction mode is the server instruction mode (server instruction mode in step S126), in step S128, with reference to the individual definition information stored in the RAM, the control unit 120 performs control such that at least one of the print unit 160, the scanner unit 170, the memory card controller 140, and the communication unit 110 operates so as to execute a function corresponding to the execution type included in the function execution instruction according to the parameters which are setting information. At this case, the control unit 120 does not display any screen on the display unit 150. Meanwhile, when the instruction mode is the device instruction mode (device instruction mode in step S126), like in step S128, the control unit 120 performs control in step S130 such that at least one of the print unit 160 and the like operates. In this case, the control unit 120 displays a screen including information on the executing function, on the display unit 150.

The function execution of step S128 or S130 will be described in detail. For example, when the individual definition information stored in the RAM is as shown in FIG. 3E, copy is set as the execution type. Therefore, the control unit 120 performs control such that the scanner unit 170 and the print unit 160 operate. When an execution to download an electric file stored in the service providing server 300 and print the electric file is set as the execution type, the control unit 120 controls the communication unit 110 to download the electric file, and then controls the print unit 160 to print the electric file. In this case, the individual definition information includes a storage destination address of the electric file (not shown). When this function is executed in step S130, the control unit 120 displays a screen as shown in FIG. 4D, on the display unit 150. In step S128, this screen is not displayed. When so-called scan-to-media is set as the execution type (not shown), the control unit 120 controls the scanner unit 170 to perform a scanning operation, and then controls the memory card controller 140 to store image data generated by the scanning operation, in the memory card 141. When this function is executed in step S130, the control unit 120 displays a screen including information representing 'READING IMAGE DATA', on the display unit 150. However, in step S128, this screen is not displayed. When an error occurs in the function execution of step S130, the control unit 120 displays a screen including information such as 'ERROR OCCURRING' on the display unit 150. However, in step S128, this screen is not displayed, similarly to the above.

In step S130, the control unit 120 displays the screens according to a display table stored in the storage unit 130 as described above. In the display table, operations and messages (information on executing functions) are associated with each other. For example, in the display table, a reading operation associated with a message 'READING IMAGE DATA', a printing operation associated with a message 'PRINTING', and error occurrence associated with a message 'ERROR OCCURRING' are registered. In step S130, the display may be executed according to a computer program. Specifically, in step S130, the control unit 120 may execute a computer program defining that if a reading operation is being executed, 'READING IMAGE DATA' is displayed, if a printing operation is being executed, 'PRINTING' is displayed, and if an error occurs, 'ERROR OCCURRING' is displayed, so as to implement display like that according to the display table.

After executing step S128 or S130, in step S132, the control unit 120 controls the communication unit 110 to transmit function execution end information, representing that the function execution instructed in the individual definition information stored in the RAM has ended, to the relay server 200. Here, the control unit 120 incorporates a unique number matching the unique number included in the individual definition information stored in the RAM, in the function execution end information. Subsequently, in step S134, the control unit 120 stores the server instruction mode as the mode flag. Step S134 is executed like step S102. Next, the control unit 120 returns to the process of step S104. At this time, the control unit 120 erases the individual definition information stored in the RAM. Alternatively, at this timing, the control unit 120 may return to step S104 without erasing. Then, if new individual definition information is received, the individual definition information stored in advance in the RAM may be overwritten with the new individual definition information. The control unit 120 repeatedly executes the main process until the user inputs end of the main process by operating the operation unit 180 or the like. If the multi-function device 100 is a touch panel model, the user may input the end of the main process using the touch panel function.

<Screen Information Generating Process>

Figure 5:
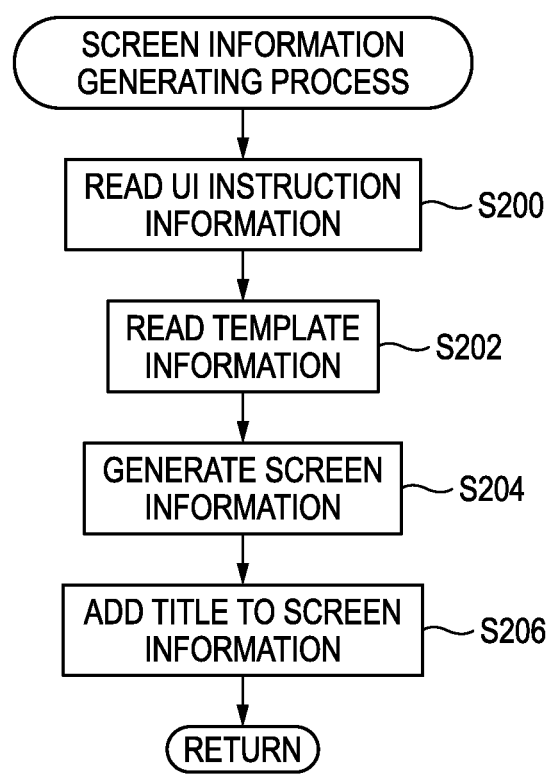
FIG. 5 is a flow chart illustrating a screen information generating process executed in the main process of FIG. 2.

The screen information generating process executed in step S114 of the main process shown in FIG. 2 will be described with reference to FIG. 5. When starting the screen information generating process, in step S200, the control unit 120 reads out the UI instruction information of the individual definition information stored in the RAM. Subsequently, in step S202, the control unit 120 reads template information stored in the storage unit 130 into the RAM. The template information has a configuration as shown in FIG. 6. Upon reading the template information, the control unit 120 identifies a screen type according to which of the unique list information, the unique input box information, and unique message information is included in the individual definition information, and extracts information according to the identified screen type from the template information. Subsequently, in step S204, the control unit 120 generates the screen information representing a portion of the screen displayed in step S116 of FIG. 2, based on the information extracted from the template information. At this time, the control unit 120 includes predetermined information of the UI instruction information in the screen information. The predetermined information includes not only information set as the list, the initial value for the input box, and the message, but also, information set as the selection method, the maximum number of characters, and the minimum number of characters.

After executing step S204, in step S206, the control unit 120 adds a character string to be the title as the UI instruction information, to the screen information generated in step S204. When the multi-function device 100 is a non-touch-panel model, the screen information includes information representing which hard key of the operation unit 180 operation of each of the 'ENTER' key, the 'PREVIOUS' key, and the 'NEXT' key is assigned to. If a hard key can be lit up, information for instructing lighting may be included in the screen information. After executing step S206, the control unit 120 returns to the process of step S116 of FIG. 2.

Figure 7:
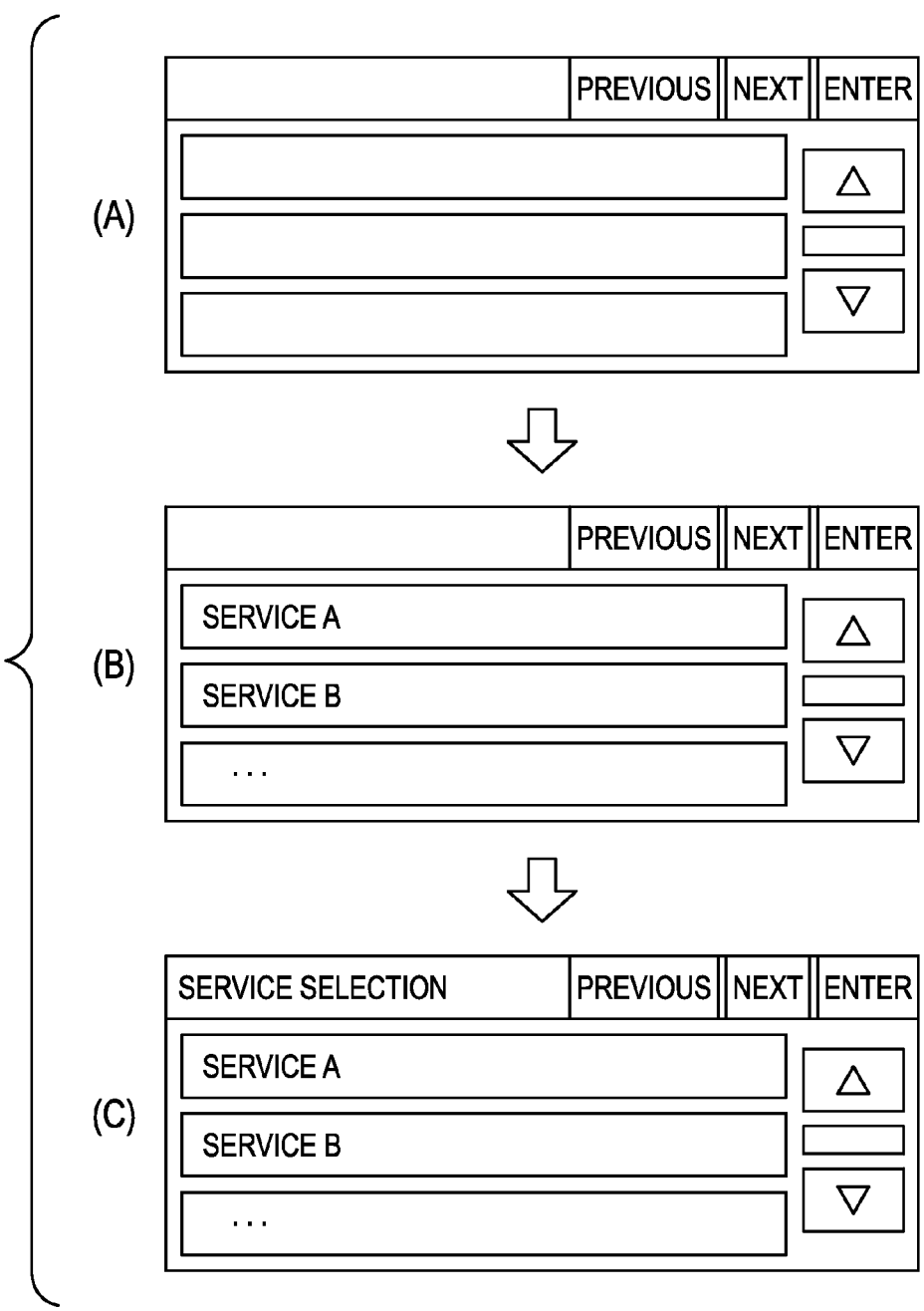
FIG. 7 is a diagram illustrating a process in which screen information is generated in the screen information generating process of FIG. 5.

Specific examples executed in steps S204 and S206 will be described with reference to FIG. 7. In the description based on FIG. 7, a case where the multi-function device 100 is a touch panel model is exemplified. For example, when the individual definition information stored in the RAM is as shown in FIG. 3A, in step S204, the control unit 120 extracts bitmap information representing a basic screen of a list corresponding to the unique list information of the individual definition information, and generates screen information representing a screen of (A) of FIG. 7 according to the bitmap information. Also, the control unit 120 disposes the service A, the service B, and the like, which are selection choices in the unique list information of the UI instruction information, at predetermined positions, so as to generate screen information representing a screen of (B) of FIG. 7. The control unit 120 includes information representing selection of one choice set as the selection method of the UI instruction, in the generated screen information. Next, in step S206, the control unit 120 disposes the title of 'SERVICE SELECTION' at a predetermined position, so as to generate screen information representing a screen of (C) of FIG. 7 (which is the same as the screen of FIG. 4A). When the individual definition information stored in the RAM is as shown in FIG. 3C, in the same manner as that of the case where the individual definition information is as shown in FIG. 3A, the screen shown in FIG. 4C is generated according to the individual definition information.

When the individual definition information stored in the RAM is as shown in FIG. 3B, in step S204, the control unit 120 extracts bitmap information representing a basic screen of the input box corresponding to the unique input box information of the individual definition information, and generates screen information according to the bitmap information. In this case, in unique screen type information (input box) of the template information, as unique keys, the left arrow key and the right arrow key, the 'CLEAR' key, and character keys (numerical keys of 0 to 9) are associated with one another. Therefore, the control unit 120 extracts bitmap information representing those keys, and generates screen information in which the bitmap information representing those keys is disposed at a predetermined position of the bitmap information representing the basic screen, according to information representing a position where same unique screen type information (input box) is included. Also, the control unit 120 disposes '200', which is the initial value for the input box in the unique input box information of the UI instruction information, at a predetermined position in the input box. Next, in step S206, the control unit 120 disposes the title of 'COPY RESOLUTION' at a predetermined position, so as to generate screen information representing the screen of FIG. 4B. The control unit 120 includes information representing that the maximum number of characters is 3 and the minimum number of characters is 3 in the UI instruction information, in the generated screen information.

<Main Process Executed by Relay Server>

Figure 8:
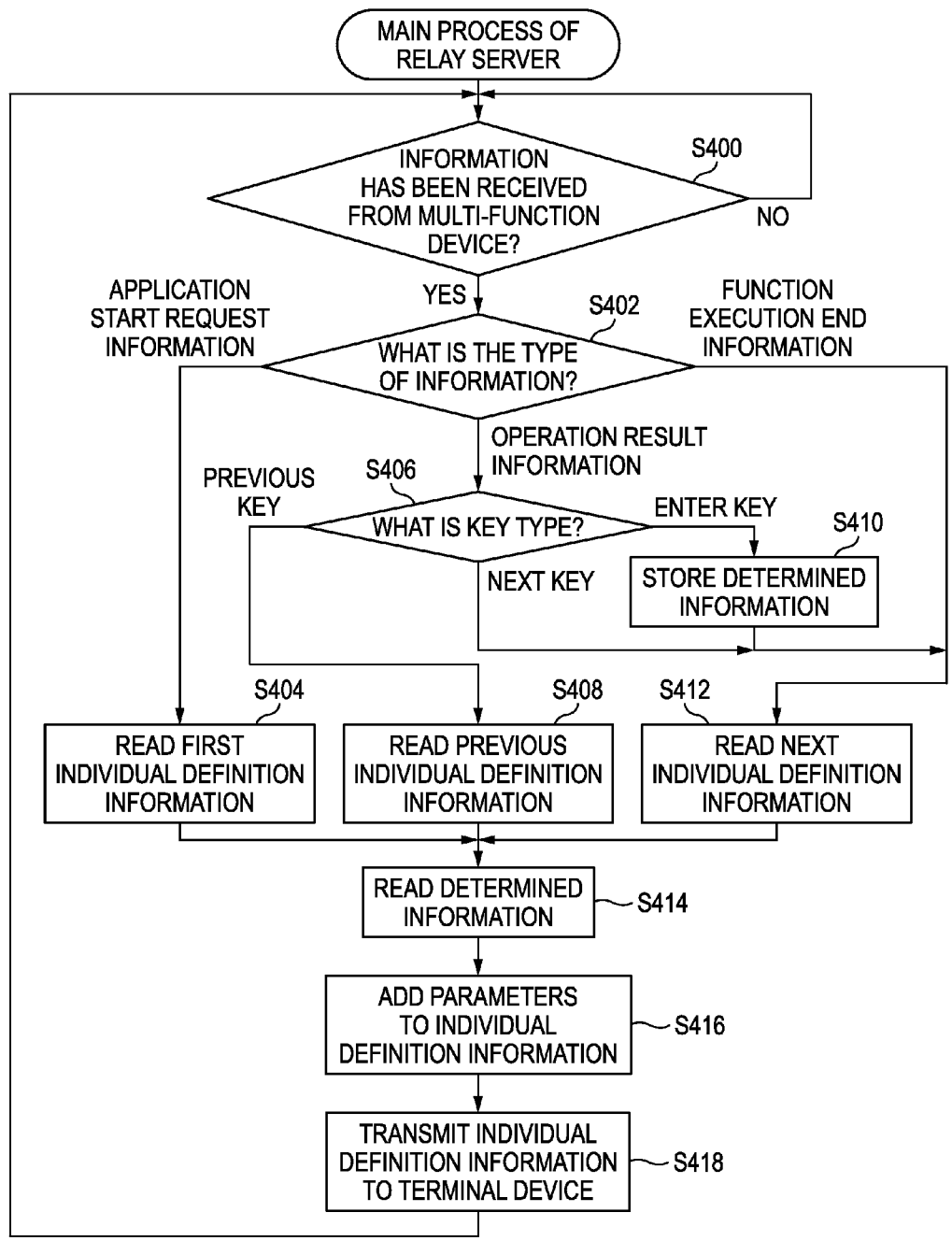
FIG. 8 is a flow chart illustrating a main process executed by the relay server.

A main process executed by the relay server 200 will be described with reference to FIG. 8. The control unit 220 of the relay server 200 stands by until receiving predetermined information from the multi-function device 100 through the network 400 (No in step S400). The control unit 220 controls the communication unit 210 to receive the predetermined information. When receiving the predetermined information (Yes in step S400), in step S402, the control unit 220 determines the type of the received predetermined information. The received predetermined information is stored in the RAM or the like included in the control unit 220. The received predetermined information may be stored as it is or the received predetermined information may be analyzed and be stored in a format appropriate for the subsequent process. The received predetermined information is any one of the application start request information, the operation result information, and the function execution end information. The application start request information is transmitted in step S100 of FIG. 2, the operation result information is transmitted in step S124 of FIG. 2, and the function execution end information is transmitted in step S132 of FIG. 2. When the predetermined information is the application start request information (application start request information in step S402), in step S404, the control unit 220 reads the first individual definition information into the RAM. Individual definition information having the smallest unique number is the first individual definition information. Specifically, the control unit 220 reads tree information shown in FIG. 9 from the storage unit 230 into the RAM. The tree information defines sequences of the unique numbers for the respective individual definition information. Subsequently, the control unit 220 identifies the smallest unique number '001' from unique numbers registered in the tree information. Then, the control unit 220 reads the individual definition information having the identified unique number '001' (see FIG. 3A) from the storage unit 230 into the RAM.

When the predetermined information is the function execution end information (function execution end information in step S402), the control unit 220 proceeds to a process of step S412. When the predetermined information is the operation result information (operation result information in step S402), in step S406, the control unit 220 determines the key type included in the received operation result information. When the key type represents the 'PREVIOUS' key (PREVIOUS' key in step S406), in step S408, the control unit 220 reads the previous individual definition information from the storage unit 230 into the RAM. Specifically, as described above, the control unit 220 reads the tree information shown in FIG. 9 into the RAM (the entire tree information read in step S404 may be used, which is the same in step S412), and identifies the previous unique number of the unique number included in the operation result information, based on the tree information. For example, when the unique number included in the operation result information is '003' (see FIG. 3B), the control unit 220 identifies a unique number '002' as the previous unique number according to the tree information. Then, the control unit 220 reads the individual definition information (previous individual definition information) including the identified previous unique number '002' from the storage unit 230 into the RAM.

When the key type represents the 'NEXT' key ('NEXT' key in step S406), the control unit 220 proceeds to a process of step S412. When the key type represents the 'ENTER' key ('ENTER' key in step S406), the control unit 220 reads first correspondence information shown in FIG. 10A from the storage unit 230 into the RAM. Also, the control unit 220 extracts the unique number included in the received operation result information. Subsequently, the control unit 220 identifies the type of determined information (first type information) associated with a unique number matching the identified unique number, according to the first correspondence information. Then, in step S410, the control unit 220 stores the determined information of the operation result information in a determined information table in association with the identified first type information. For example, when the received operation result information includes the key type representing the 'ENTER' key, the determined information '200', and the unique number '003', the control unit 220 identifies 'COPY RESOLUTION' associated with the unique number '003', based on the first correspondence information. Then, the control unit 220 stores the determined information '200' in the determined information table in association with 'COPY RESOLUTION' as shown in FIG. 10B. After executing step S410, the control unit 220 proceeds to a process of step S412.

In step S412, the control unit 220 reads the next individual definition information from the storage unit 230 into the RAM. Specifically, like in step S408, the control unit 220 identifies the next unique number of the unique number of the received operation result information, based on the unique number of the received operation result information the tree information shown in FIG. 9. For example, when the unique number of the operation result information is '001' (see FIG. 3A), the control unit 220 identifies the next unique number '002' based on the tree information. When the unique number of the operation result information is '008' (see FIG. 3C), the control unit 220 identifies the next unique number '009' (see FIG. 3D) based on the tree information. When the unique number of the operation result information is '009' (see FIG. 3D), the control unit 220 identifies the next unique number '010' (see FIG. 3E) based on the tree information. The control unit 220 reads individual definition information (next individual definition information) having the identified next unique number '002', '009', or '010' from the storage unit 230 into the RAM. After executing step S404, S408, or S412, in step S414, the control unit 220 reads the determined information stored in the determined information table as shown in FIG. 10B.

Step S414 will be described. The control unit 220 extracts the unique number included in the individual definition information which has been read into the RAM in step S404, S408, or S412. Also, the control unit 220 reads second correspondence information shown in FIG. 10C from the storage unit 230 into the RAM. Next, the control unit 220 determines whether a unique number matching the extracted unique number has been registered in the second correspondence information. Then, when a unique number corresponding to the extracted unique number has been registered in the second correspondence information, the control unit 220 identifies the type of determined information (second type information) associated with the unique number in the second correspondence information. Subsequently, the control unit 220 reads the determined information stored in the determined information table in association with the first type information which is the same as the identified second type information. Meanwhile, when a unique number matching the extracted unique number has not been registered in the second correspondence information, the control unit 220 does not read the determined information. Here, in the second correspondence information, any unique numbers of individual definition information in which the instruction type is the UI instruction is not registered. In other words, only unique numbers of individual definition information in which the instruction type is the function execution instruction is registered. Therefore, when the instruction type of the individual definition information which has been read into the RAM in step S404, S408, or S412 is the UI instruction, the control unit 220 does not read the determined information from the determined information table. In the example shown in FIG. 10C, the unique number '010' is a unique number of function execution instruction information for copy (see FIG. 3E), and a unique number '033' is a unique number of function execution instruction information for scan-to-media.

After executing step S414, in step S416, the control unit 220 adds parameters corresponding to the determined information read in step S414, to the individual definition information stored in the RAM. For example, when the individual definition information stored in the RAM is as shown in FIG. 3E, in step S414, the copy resolution, the number of copies, and the color/monochrome mode information are specified based on the second correspondence information. Then, determined information associated with the specified information is read from the determined information table. For example, referring to FIG. 10B, 200 dpi is read as the copy resolution, 3 is read as the number of copies, and a color mode is read as the color/monochrome mode information. Therefore, in step S416, the read information is added as parameters for executing the copy function. When the instruction type of the individual definition information stored in the RAM is the UI instruction, since the determined information is not read in step S414 as described above, in step S416, any parameters are not added, and the entire individual definition information read in step S404, S408, or S412 is stored in the RAM. Subsequently, in step S418, the control unit 220 controls the communication unit 210 to transmit the individual definition information stored in the RAM to the multi-function device 100. After executing step S418, the control unit 220 returns to the process of step S400, and repeatedly executes the main process.

As described above, in the present illustrative embodiment, all image data such as bitmap data representing screens displayed on the display unit 150 of the multi-function device 100 is not necessary to be transmitted and received between the multi-function device 100 and the relay server 200 through the network 400. Therefore, it is possible to reduce a communication load between the devices in the screen display. Further, the multi-function device 100 does not need to manage screen transition, and the relay server 200 does not need to manage image data and the like representing the basic screen according to the screen type and various keys. In this state, predetermined operation can be appropriately performed on the multi-function device 100 so as to effectively execute screen transition according to the operation. Particularly, even if the system 1 includes a plurality of multi-function devices 100 (for example, a multi-function device which is a touch panel model and a multi-function device which is a non-touch-panel model), the relay server 200 does not need to manage basic screens and the like according to the screen types of the plurality of multi-function devices 100 on purpose, which is preferable. It is assumed that, in addition to the service A and the service B, a service C is newly provided by the service providing server 300A, the service providing server 300B, or another service providing server. In this case, in order to make the service C selectable, in the screen shown in FIG. 4A, the service C should be included as a selection choice. With respect to this situation, in the present illustrative embodiment, individual definition information in which the service C is added to the service A and the service B is transmitted from the relay server 200 and is received by the multi-function device 100. Then, in the above-mentioned manner, a list including the service C as a selection choice is displayed on the display unit 150. Therefore, even if image data representing the service C as a selection choice has not been stored, it is possible to select the service C in the multi-function device 100. In other words, in the present illustrative embodiment, in the multi-function device 100, even if new image data for screen display is not additionally stored, it is possible to cope with addition of a new service. Particularly, even when the system 1 includes a plurality of multi-function device 100, new image data for screen display does not need to be additionally stored, which is preferable.

The screen control system 10 uses the individual definition information as shown in FIG. 3D, and thus the multi-function device 100 can be appropriately switched to a device instruction mode which is a mode for displaying a screen including information on an executing function. Therefore, when a predetermined function is executed in the multi-function device 100, it is possible to display a screen including information on the executing function on the display unit 150, in accordance of the display table stored in the storage unit 130 or by executing a computer program. In other words, in the present illustrative embodiment, the multi-function device 100 does not need to receive data (including image data) for the screen including the information on the executing function through the network 400, and can quickly display the screen at a timing corresponding to the start of the function execution.

The present illustrative embodiment described above may have the following configuration. That is, in the illustrative embodiment, the example in which the multi-function device 100 performs communication with the relay server 200 has been described. The above-mentioned process executed by the relay server 200 may be executed by any one or both of the service providing servers 300A and 300B. In this case, the relay server 200 may be omitted. In the main process of the multi-function device 100 shown in FIG. 2, the mode flag may be omitted. In this case, steps S102, S108, S110, S112, S126, S128, and S134 may be omitted. As the network 400, not only the Internet network but also, for example, a LAN may be used. The data communication can use not only the HTTP/1.1 but also an HTTP other than the HTTP/1.1, a FTP or a unique protocol. Further, the multi-function device 100 having the printing function, the scanner function, a copy function, and the fax function has been exemplified; however, a device capable of using the configuration of the present illustrative embodiment may be another device different from the multi-function device 100. For example, office devices such as a printer, a scanner, a copy machine, and a facsimile, mobile terminals such as a portable phone, a PDA, and a head-mounted display, AV products such as a camera, a player, and a television set, home appliances such as a phone, a digital photo frame, a microwave, and a refrigerator, medical devices, and the like can employ the configuration of the present illustrative embodiment.

In the illustrative embodiment, as the individual definition information in which the instruction mode is the device instruction, individual definition information as shown in FIG. 3D has been described as an example. In other words, as described above, in the individual definition information having the unique number '009', only the device instruction mode is set as the instruction mode, and this individual definition information is transmitted from the relay server 200 to the multi-function device 100. However, this individual definition information in which only the device instruction mode is set as the instruction mode may be omitted. In this case, in the individual definition information having the unique number '008' as shown in FIG. 3C, transmitted previously to the omitted individual definition information having the unique number '009', the device instruction mode is set as the instruction mode. Then, in the main process of the multi-function device 100 shown in FIG. 2, after the process of step S112, the process of step S114 and subsequent processes are executed in the same manner. Even in this configuration, it is possible to implement operations as described above. Also, the individual definition information as shown in FIG. 3D may or may not be omitted. In other words, when the individual definition information as shown in FIG. 3D is omitted, in the individual definition information, in which the instruction type is the function execution instruction as shown in FIG. 3E, transmitted subsequent to the omitted individual definition information having the unique number '009', the device instruction mode is set as the instruction mode, and this individual definition information is transmitted from the relay server 200 to the multi-function device 100. In this case, in the main process of the multi-function device 100 shown in FIG. 2, when the instruction type included in the individual definition information stored in the RAM is the function execution instruction (function execution instruction in step S106), subsequently, the control unit 220 determines whether any instruction mode is included, and determines the instruction mode if any instruction mode is included. Then, if the instruction mode is the device instruction mode, the control unit 220 proceeds to the process of step S130, and if the instruction mode is the server instruction mode, the control unit 220 proceeds to the process of step S128. Meanwhile, if any instruction mode is not included, as described above, the control unit 220 determines the mode flag in step S126. Then, if the mode flag represents the device instruction mode, the control unit 220 proceeds to the process of step S130, and if the mode flag represents the server instruction mode, the control unit 220 proceeds to the process of step S128.

What is claimed is:

1. A terminal device configured to communicate with a server, the terminal device comprising:
   an operation unit configured to receive a user operation;
   a function unit configured to execute at least one function of a printing function and a scanner function;
   a display unit configured to display a screen;
   a storage unit configured to store therein screen information associated with each of the at least one function;
   a mode switch unit configured to switch between a device instruction mode and a server instruction mode;
   a first transmission control unit configured to transmit an application start request to the server, the application start request requests using a specific service which uses the function unit, wherein the mode switch unit is configured to set the server instruction mode when transmitting the application start request;
   a first reception control unit configured to receive a screen display instruction which is related to displaying of a first type screen for receiving an input of setting of the at least one function used in the specific service and is identified by a unique identifier, from the server;
   a display determination unit configured to determine to display the first type screen on the display unit according to the display instruction when the first reception control unit receives the screen display instruction in a state where the server instruction mode is set; and
   a display control unit configured to display the first type screen on the display unit according to the screen display instruction when the display determination unit determines to display the first type screen,
   wherein when the operation unit is operated to receive setting of the at least one function in a state where the display control unit is displaying the first type screen on the display unit, the first transmission control unit is configured to transmit an operation result and a unique identifier, the operation result representing the setting of the at least one function, the unique identifier matching the unique identifier identifying the screen display instruction for the displaying of the first type screen, to the server,
   wherein the first reception control unit is configured to further receive a mode instruction for switching the terminal device to the device instruction mode, and when the first reception control unit receives the mode instruction, the mode switch unit is configured to set the device instruction mode,
   wherein the first reception control unit is configured to further receive an execution instruction which instructs executing the at least one function of the function unit, includes the setting of the at least one function and is identified by a unique identifier, from the server,
   wherein the display determination unit is further configured to determine to display a second type screen on the display unit according to the screen information stored in the storage unit when the first reception control unit receives the execution instruction in a state where the device instruction mode is set,
   wherein when the first reception control unit receives the execution instruction, the function unit is configured to execute the at least one function based on the setting of the at least one function included in the received execution instruction, and
   wherein when the display determination unit determines to display the second type screen and the function unit is executing the at least one function, the display control unit is configured to display the second type screen on the display unit according to the screen information, the screen information being stored in the storage unit and associated with the at least one function instructed to be executed.

2. The terminal device according to claim 1,
wherein the display determination unit is configured to determine to display the first type screen on the display unit according to the screen display instruction when the first reception control unit receives the screen display instruction in a state where the server instruction mode is set, and is configured to determine not to display the first type screen on the display unit according to the screen display instruction when the first reception control unit receives the screen display instruction in a state where the device instruction mode is set.

3. The terminal device according to claim 1,
wherein the display determination unit is configured to determine to display the second type screen on the display unit when the first reception control unit receives the execution instruction in a state where the device instruction mode is set, and is configured to determine not to display the second type screen when the first reception control unit receives the execution instruction in a state where the server instruction mode is set.

4. The terminal device according to claim 1,
wherein when the function unit has executed the at least one function according to the execution instruction, the first transmission control unit is configured to transmit an execution result representing an end of the executing of the at least one function and a unique identifier matching the unique identifier identifying the execution instruction for the executing of at least one function, to the server.

5. The terminal device according to claim 1,
wherein when the function unit has executed the at least one function according to the execution instruction, the mode setting unit is configured to set the server instruction mode.

6. The terminal device according to claim 1,
wherein the specific service is provided by a service server which is different from the server.

7. The terminal device according to claim 6,
wherein the specific service includes downloading an electric file from the service server and printing the electric file by the printing function of the function unit.

8. The terminal device according to claim 6,
wherein the specific service includes scanning a document by the scanning function of the function unit to generate an electric file and uploading the electric file to the service server.

9. A server configured to communicate with a terminal device which includes: a function unit configured to execute at least one function of a printing function and a scanner function used in a specific service; a display unit configured to display a screen; a terminal storage unit configured to store therein screen information associated with each of the at least one function; a mode switch unit configured to switch between a device instruction mode and a server instruction mode; and a display control unit configured to display a second type screen on the display unit according to screen information stored in the terminal storage unit when the function unit is executing a function, the server comprising:
a first storage unit configured to store a plurality of screen display instructions, each of which is related to displaying of a first type screen for receiving an input of setting of the at least one function on the display unit and is identified by an unique identifier, a plurality of execution instructions, each of which instructs executing of the at least one function of the function unit and is identified by a unique identifier, and a mode instruction which is for switching the terminal device to the device instruction mode and is identified by a unique identifier;
a second storage unit configured to store tree information defining sequences of the plurality of screen display instructions, the plurality of execution instructions and the mode instruction, based on the respective unique identifiers thereof, wherein a sequence of a unique identifier identifying an execution instruction is subsequent to a sequence of a unique identifier identifying the mode instruction;
a second transmission control unit configured to transmit any one of the screen display instructions to the terminal device; and
a second reception control unit configured to receive a unique identifier and an operation result, wherein the unique identifier and the operation result are replied by the terminal device having received the screen display instruction transmitted by the second transmission control unit when an operation unit of the terminal device is operated to receive setting of the at least one function in a state where the display control unit is displaying the first type screen for receiving an input of the setting of the at least one function on the display unit according to the received screen display instruction, and wherein the unique identifier matches an unique identifier identifying the screen display instruction for the displaying of the first type screen, and the operation result represents the setting of the at least one function; and
an identifying unit,
wherein when the second reception control unit receives the unique identifier and the operation result, the identifying unit is configured to identify a screen display instruction, an execution instruction or the mode instruction to be newly transmitted to the terminal device based on the unique identifier received by the second reception control unit and the tree information,
wherein the second transmission control unit is configured to newly transmit the screen display instruction, the execution instruction or the mode instruction identified by the identifying unit, and
wherein the execution instruction includes the setting of the at least one function represented by the operation result received by the second reception control unit.

10. A non-transitory computer-readable medium having a computer program stored thereon and readable by a computer controlling a server configured to communicate with a terminal device which includes: a function unit configured to execute at least one function of a printing function and a scanner function used in a specific service; a display unit configured to display a screen; a terminal storage unit configured to store therein screen information associated with each of the at least one function; a mode switch unit configured to switch between a device instruction mode and a server instruction mode; and a display control unit configured to display a second type screen on the display unit according to screen information stored in the terminal storage unit when the function unit is executing a function, the server configured to cause the display unit to display a screen and including: a first storage unit configured to store a plurality of screen display instructions, each of which is related to displaying of a first type screen for receiving an input of setting of the at least one function on the display unit and is identified by an unique identifier, a plurality of execution instructions, each of which instructs executing of the at least one function of the function unit and is identified by a unique identifier, and a mode instruction which is for switching the terminal device to the device instruction mode and is identified by a unique identifier; and a second storage unit configured to store tree information defining sequences of the plurality of screen display instructions, the plurality of execution instructions and the mode instruction, based on the respective unique identifiers thereof, wherein a sequence of a unique identifier identifying an execution instruction is subsequent to a sequence of a unique identifier identifying the mode instruction, the computer program, when executed by the computer, causing the computer to perform operations comprising:

- transmitting any one of the screen display instructions to the terminal device;
- receiving a unique identifier and an operation result, wherein the unique identifier and the operation result are replied by the terminal device having received the screen display instruction transmitted by the server when an operation unit of the terminal device is operated to receive setting of the at least one function in a state where the display control unit is displaying a first type screen for receiving an input of the setting of the at least one function on the display unit according to the received screen display instruction, and wherein the unique identifier matches an unique identifier identifying the screen display instruction for the displaying of the first type screen, and the operation result represents the setting of the at least one function;
- when receiving the unique identifier and the operation result, identifying a screen display instruction, an execution instruction or the mode instruction to be newly transmitted based on the received unique identifier and the tree information; and
- newly transmitting the screen display instruction, the execution instruction or the mode instruction identified in the identifying operation,
- wherein the execution instruction includes the setting of the at least one function represented by the received operation result.

11. A terminal device configured to communicate with a server, the terminal device comprising:

- an operation unit configured to receive a user operation;
- a function unit configured to execute at least one function of a printing function and a scanner function;
- a display unit configured to display a screen;
- a storage unit configured to store therein screen information associated with each of the at least one function;
- a mode switch unit configured to switch between a device instruction mode and a server instruction mode;
- a first transmission control unit configured to transmit an application start request to request using a specific service from among a plurality of services which use the function unit wherein the mode switch unit is configured to set the server instruction mode when transmitting the application start request;
- a first reception control unit configured to:
  - receive a first type UI instruction which is related to displaying of a first type screen for receiving an input of a selection instruction of using the specific service from among the plurality of services which use the function unit and which is individual definition information identified by a unique identifier, from the server which has received the application start request;
  - in a state where the first reception control unit has received the first type UI instruction, receive a second type UI instruction which is related to displaying of a second type screen for receiving an input of setting of the at least one function used in the specific service and which is individual definition information identified by a unique identifier, from the server;
  - in a state where the first reception control unit has received the second type UI instruction, receive a function execution instruction which instructs executing of a function of the function unit corresponding to the specific service and which is individual definition information identified by a unique identifier, from the server, and
  - in a state where the first reception control unit has received the second type UI instruction, receive a third type UI instruction which is individual definition information for switching the terminal device to the device instruction mode, wherein when the first reception control unit receives the third type UI instruction, the mode switch unit is configured to set the device instruction mode,
- a display determination unit configured to:
  - when the first reception control unit receives the first type UI instruction in a state where the server instruction mode is set, determine to display the first type screen on the display unit according to the first type UI instruction;
  - when the first reception control unit receives the second type UI instruction in a state where the server instruction mode is set, determine to display the second type screen on the display unit according to the second type UI instruction;
  - when the first reception control unit receives the function execution instruction in a state where the device instruction mode is set, determine to display a third type screen on the display unit irrespective of the individual definition information from the server, wherein the function execution instruction includes the setting of the at least one function, and when the first reception control unit receives the function execution instruction, the function unit is configured to execute the at least one function based on the setting of the at least one function included in the received function execution instruction;
- a display control unit is configured to:
  - when the display determination unit determines to display the first type screen, display the first type screen on the display unit according to the first type UI instruction;
  - when the display determination unit determines to display the second type screen, display the second type screen on the display unit according to the second type UI instruction; and
  - when the display determination unit determines to display the third type screen and the function unit is executing the at least one function, displays the third type screen on the display unit irrespective of the individual definition information from the server, the third type screen including screen information which is stored in the storage unit and is associated with the at least one function instructed to be executed;
- a second transmission control unit configured to:
  - when the operation unit is operated to receive a selection instruction of the specific service in a state where the display control unit is displaying the first type screen on the display unit, transmit operation result information representing the specific service and including a unique identifier matching the unique identifier identifying the first type UI instruction for displaying the first type screen, to the server;

when the operation unit is operated to receive setting of the at least one function in a state where the display control unit is displaying the second type screen, transmit operation result information representing the setting of the at least one function and including a unique identifier matching the unique identifier identifying the second type UI instruction for displaying the second type screen, to the server; and when the function unit has executed the at least one function according to the function execution instruction, transmit function execution end information representing an end of executing the function and including a unique identifier matching the unique identifier identifying the function execution instruction for executing of the function unit, to the server, and wherein the first reception control unit is configured to:
in a state where the second transmission control unit has transmitted the function execution end information, receive individual definition information which is different from each of the individual definition information of the first type UI instruction, the second type UI instruction and the function execution instruction, from the server.

12. The terminal device according to claim 11,
wherein the display determination unit is configured to:
when the first reception control unit receives the first type UI instruction in a state where the server instruction mode is set, determine to display the first type screen on the display unit according to the first type UI instruction;
when the first reception control unit receives the second type UI instruction in the state where the server instruction mode is set, determine to display the second type screen on the display unit according to the second type UI instruction;
when the first reception control unit receives the first type UI instruction in a state where the device instruction mode is set, determine not to display the first type screen according to the first type UI instruction; and
when the first reception control unit receives the second type UI instruction in the state where the device instruction mode is set, determine not to display the second type screen according to the second type UI instruction.

13. The terminal device according to claim 1,
wherein the display determination unit is configured to:
when the first reception control unit receive the function execution instruction in a state where the device instruction mode is set, determine to display the third type screen on the display unit; and
when the first reception control unit receives the function execution instruction in a state where the server instruction mode is set, determine not to display the third type screen.

14. The terminal device according to claim 11,
wherein when the function unit has executed the at least one function according to the execution instruction, the mode setting unit is configured to set the server instruction mode.

15. The terminal device according to claim 11,
wherein each of the plurality of services is provided by a service server which is different from the server.

16. The terminal device according to claim 15,
wherein the plurality of services includes a service of downloading an electric file from the service server and printing the electric file by the printing function of the function unit.

17. The terminal device according to claim 15,
wherein the plurality of services includes a service of scanning a document by the scanning function of the function unit to generate an electric file and uploading the electric file to the service server.

18. A server configured to communicate with a terminal device which includes: a function unit configured to execute at least one function of a printing function and a scanner function; a display unit configured to display a screen; a terminal storage unit configured to store therein screen information associated with each of the at least one function; a mode switch unit configured to switch between a device instruction mode and a server instruction mode; and a display control unit configured to display, on the display unit, a first type screen for receiving an input of a selection instruction of using a specific service from among a plurality of services which use the function unit, a second type screen for receiving an input of setting of the function unit used in the specific service, and a third type screen when the function unit is executing the at least one function, the third type screen including screen information which is stored in the terminal storage unit and is associated with the at least one function, the server comprising:

a first storage unit configured to store a first type UI instruction which is related to displaying of the first type screen on the display unit and is individual definition information identified by a unique identifier, a second type UI instruction which is related to displaying of the second type screen on the display unit and is individual definition information identified by a unique identifier, a third type UI instruction which is for switching the terminal device to the device instruction mode and which is identified by a unique identifier, a function execution instruction which instructs executing of a function of the function unit corresponding to the specific service and which is individual definition information identified by a unique identifier, and a plurality of individual definition information which are identified by unique identifiers different from those of the first type UI instruction, the second type UI instruction, the third type UI instruction and the function execution instruction;

a second storage unit configured to store tree information defining sequences of the first type UI instruction, the second type UI instruction, the third type UI instruction, the function execution instruction and the plurality of individual definition information which are different from the first type UI instruction, the second type UI instruction, the third type UI instruction and the function execution instruction, based on the respective unique identifiers thereof, wherein in the tree information, a sequence of the unique identifier identifying the third type UI instruction is defined to be later than the unique identifier identifying the first type UI instruction and the unique identifier identifying the second type UI instruction, and a sequence of the unique identifier identifying the function execution instruction is defined to be subsequent to the third type UI instruction;

a third transmission control unit configured to transmit the first type UI instruction, the second type UI instruction, the third type UI instruction, the function execution instruction, and the plurality of individual definition information which are different from the first type UI instruction, the second type UI instruction, the third type UI instruction and the function execution instruction; and a second reception control unit is configured to:
receive an application start request to request using a specific service from among the plurality of services which use the function unit, from the terminal device;
receive operation result information representing the specific service and including a unique identifier matching the unique identifier identifying the first UI instruction for displaying the first type screen on the display unit, wherein the operation result information is replied by the terminal device having received the first type UI instruction when an operation unit of the terminal device is operated to receive the selection instruction of the specific service in a state where the display control unit is displaying the first type screen on the display unit;
receive operation result information representing a setting of the at least one function and including a unique identifier matching the unique identifier identifying the second UI instruction for displaying the second display screen on the display unit, wherein the operation result information is replied by the terminal device having received the second type UI instruction when the operation unit of the terminal device is operated to receive the setting of the function unit in a state where the display control unit is displaying the second type screen on the display unit; and
receive function execution end information representing an end of executing the function and including a unique identifier matching the unique identifier identifying the function execution instruction for executing of the function unit, wherein the function execution end information is replied by the terminal device when the function unit has executed the function according to the function execution instruction;
an identifying unit is configured to:
when the second reception control unit receives the application start request, a predetermined result information including the operation result information which includes the unique identifier and represents the specific service or the setting of the at least one function, or the function execution end information including the unique identifier, identify individual definition information to be newly transmitted to the terminal device based on the received unique identifier and the tree information, wherein the third transmission control unit configured to:
when a first type UI instruction is identified by the identifying unit, newly transmit the first type UI instruction to the terminal device;
when a second type UI instruction is identified by the identifying unit, newly transmit the second type UI instruction to the terminal device;
when a third type UI instruction is identified by the identifying unit, newly transmit the third type UI instruction to the terminal device;
when a function execution instruction is identified by the identifying unit, newly transmit the function execution instruction which includes the setting of the at least one function represented by the operation result information received by the second reception control unit to the terminal device; and
when predetermined individual definition instruction, which is different from the first type UI instruction, the second type UI instruction, the third type UI instruction and the function execution instruction, is identified by the identifying unit, newly transmit the predetermined individual definition instruction to the terminal device.

19. A non-transitory computer-readable medium having a computer program stored thereon and readable by a computer controlling a server configured to communicate with a terminal device which includes: a function unit configured to execute at least one function of a printing function and a scanner function; a display unit configured to display a screen; a terminal storage unit configured to store therein screen information associated with each of the at least one function; a mode switch unit configured to switch between a device instruction mode and a server instruction mode; and a display control unit configured to display, on the display unit, a first type screen for receiving an input of a selection instruction of using a specific service from among a plurality of services which use the function unit, a second type screen for receiving an input of setting of the function unit used in the specific service, and a third type screen when the function unit is executing the at least one function, the third type screen including screen information which is stored in the terminal storage unit and is associated with the at least one function, the server including: a first storage unit configured to store a first type UI instruction which is related to displaying of the first type screen on the display unit and is individual definition information identified by a unique identifier, a second type UI instruction which is related to displaying of the second type screen on the display unit and is individual definition information identified by a unique identifier, a third type UI instruction which is for switching the terminal device to the device instruction mode and which is identified by a unique identifier, a function execution instruction which instructs executing of a function of the function unit corresponding to the specific service and which is individual definition information identified by a unique identifier, and a plurality of individual definition information which are identified by unique identifiers different from those of the first type UI instruction, the second type UI instruction, the third type UI instruction and the function execution instruction; and a second storage unit configured to store tree information defining sequences of the first type UI instruction, the second type UI instruction, the third type UI instruction, the function execution instruction and the plurality of individual definition information which are different from the first type UI instruction, the second type UI instruction, the third type UI instruction and the function execution instruction, based on the respective unique identifiers thereof, wherein in the tree information, a sequence of the unique identifier identifying the third type UI instruction is defined to be later than the unique identifier identifying the first type UI instruction and the unique identifier identifying the second type UI instruction, and a sequence of the unique identifier identifying the function execution instruction is defined to be subsequent to the third type UI instruction, the computer program, when executed by the computer, causing the computer to perform operations comprising:
transmitting any of the first type UI instruction, the second type UI instruction, the third type UI instruction, the function execution instruction, and the plurality of individual definition information which are different from the first type UI instruction, the second type UI instruction, the third type UI instruction and the function execution instruction;
receiving an application start request to request using a specific service from among the plurality of services which use the function unit, from the terminal device;

receiving operation result information representing the specific service and including a unique identifier matching the unique identifier identifying the first UI instruction for displaying the first type screen on the display unit, wherein the operation result information is replied by the terminal device having received the first type UI instruction when an operation unit of the terminal device is operated to receive the selection instruction of the specific service in a state where the display control unit is displaying the first type screen on the display unit;

receiving operation result information representing a setting of the at least one of function and including a unique identifier matching the unique identifier identifying the second UI instruction for displaying the second display screen on the display unit, wherein the operation result information is replied by the terminal device having received the second type UI instruction when the operation unit of the terminal device is operated to receive the setting of the function unit in a state where the display control unit is displaying the second type screen on the display unit;

receiving function execution end information representing an end of executing the function and including a unique identifier matching the unique identifier identifying the function execution instruction for executing of the function unit, wherein the function execution end information is replied by the terminal device when the function unit has executed the function according to the function execution instruction;

when receiving the application start request, a predetermined result information including the operation result information which includes the unique identifier and represents the specific service or the setting of the at least one function, or the function execution end information including the unique identifier, identifying individual definition information to be newly transmitted to the terminal device based on the received unique identifier and the tree information;

when a first type UI instruction is identified by the identifying operation, newly transmitting the first type UI instruction to the terminal device;

when a second type UI instruction is identified by the identifying operation, newly transmitting the second type UI instruction to the terminal device;

when a third type UI instruction is identified by the identifying operation, newly transmit the third type UI instruction to the terminal device;

when a function execution instruction is identified by the identifying operation, newly transmitting the function execution instruction which includes the setting of the at least one function represented by the received operation result information to the terminal device; and when predetermined individual definition instruction, which is different from the first type UI instruction, the second type UI instruction and the function execution instruction, is identified by the identifying operation, newly transmitting the predetermined individual definition instruction to the terminal device.

* * * * *